Dec. 15, 1936.  C. H. HUGHES  2,064,008
PROCESS OF MAKING CARBURETED WATER GAS
Original Filed June 5, 1931    2 Sheets—Sheet 1
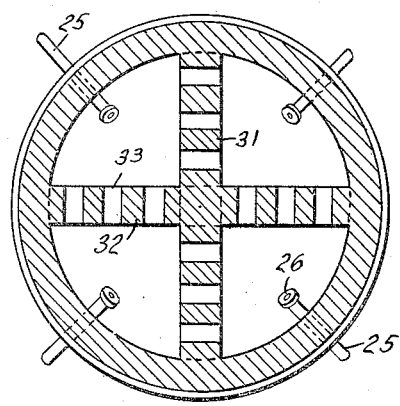
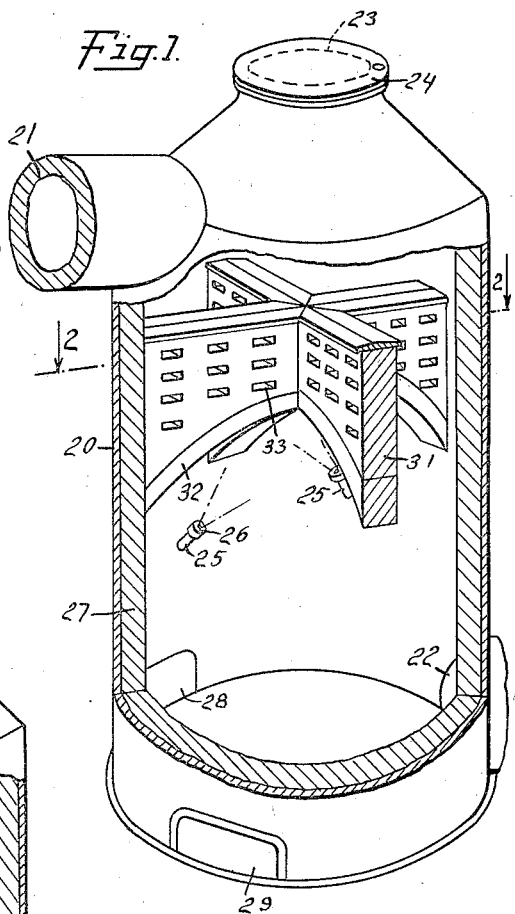
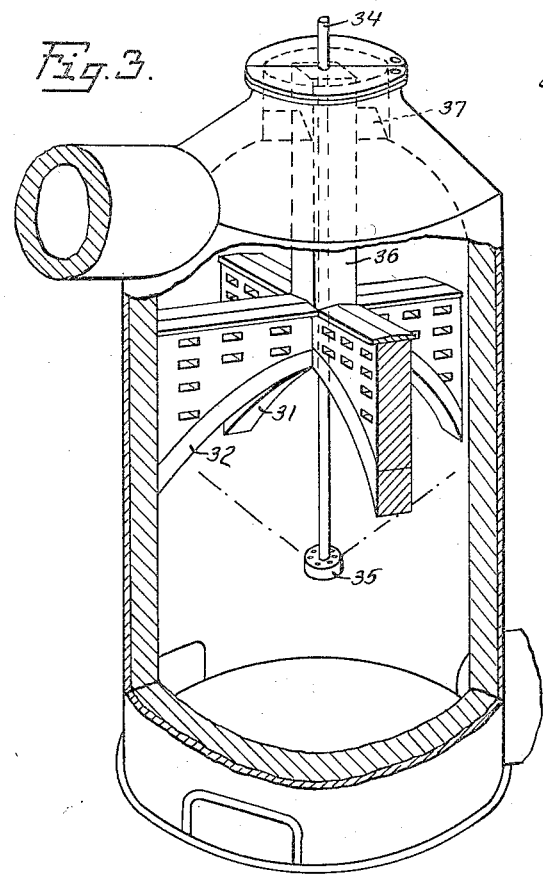
INVENTOR
Charles H. Hughes
BY
ATTORNEY Patented Dec. 15, 1936

2,064,008

UNITED STATES PATENT OFFICE 2,064,008

PROCESS OF MAKING CARBURETED WATER GAS

Charles H. Hughes, Glen Ridge, N. J., assignor to Semet-Solvay Engineering Corporation, New York, N. Y., a corporation of New York Original application June 5, 1931, Serial No. 542,271. Divided and this application July 19, 1933, Serial No. 681,061. In Great Britain June 1, 1932

5 Claims. (Cl. 48—205)

This invention is directed to the manufacture of carbureted water gas, and more particularly, to the operation of a carbureted water gas set involving a generator, carburetor, and superheater connected in series. This application is a divisional of my copending application, Serial No. 542,271, filed June 5, 1931.

One object of this invention is to provide a process of making carbureted water gas in a carburetor of such construction and design that the blast gases admixed with secondary air and passed through the carburetor are substantially immediately ignited upon entrance into the carburetor and burned in its passage through the carburetor, thus efficiently utilizing both the sensible and latent heat of the blast gases in the heating of the carburetor during the blasting cycle. During the subsequent gas-making cycle, the carburetor of this invention functions to accomplish efficient vaporization and admixture of the oil introduced thereinto with the water gas passed therethrough. Preferably, Bunker C or other crude oils are employed to enrich the water gas. The carbonaceous material formed by the decomposition of the crude oils settles in the unobstructed base portion of the carburetor without interfering with the gas flow through the carburetor.

Heretofore, the usual water gas set consisted of a generator containing a bed of fuel and a carburetor and a superheater connected in series with the generator. The interiors of both the carburetor and the superheater were built up with checkerbrick material arranged in staggered relation to form tortuous flues. In the manufacture of water gas, the blast gases produced in the generator by the passage of air or other oxygen-containing gas through the fuel bed therein, were discharged from the generator and passed into and through the carburetor and superheater. Secondary air admitted to the carburetor and the superheater was admixed with the blast gases and this mixture was ignited in its passage over the checkerbrick and burned in these chambers, thus heating the checkerbrick. This blasting cycle approximately lasted three minutes.

Thereafter, it was discontinued and the steam, admitted into the generator, passed therethrough reacting with the fuel bed therein to produce water gas which was passed into the carburetor. Oil was introduced into the top of the carburetor, the resultant oil gas mixing with the water gas passing over the checkerbrick therein. The mixture of oil gas and water gas, in its passage through the carburetor and superheater chambers, was fixed to form carbureted water gas. Thereafter, if desired, steam was passed in reverse flow through the superheater and carburetor units down through the fuel bed in the generator, the resultant water gas being withdrawn directly from the base of the generator. When the temperatures of the fuel bed and the carburetor and superheater chambers had been reduced so that water gas could no longer be generated, the gas-making cycles were discontinued and the fuel bed again blasted with air or other oxygen-containing gas, and upon completion of this blasting cycle, the water gas-making cycles were repeated.

It has been proposed to substitute for the usual enriching oil, which does not form substantial carbonaceous deposits on the checkerbrick, Bunker-C, crude, or unrefined oils. In practice, however, it has been found that such oils leave an increased carbonaceous deposit on the checkerbrick in the carburetor, clogging the flues and necessitating frequent shut-downs for recheckering. The arrangement of checkerwork in the carburetor precludes the cleaning thereof without removal of the checkerbrick from the carburetor chamber and consequently the entire checkerwork had to be replaced, thus entailing arduous and time-consuming labor and reducing the gas-making capacity of the plant, since the carburetor had to be taken out of operation for a considerable period of time.

In accordance with Doherty United States Patent No. 992,944, of May 23, 1911, the amount of checkerbrick in the carburetor of a water gas set has been reduced and the carbureting oil has been introduced into an unobstructed space at the top of the carburetor, into the downwardly flowing water gas stream, so as to obtain substantially complete volatilization of the oil before it contacts with hot checkerbrick to thereby reduce or eliminate the formation of carbonaceous deposits. Further, in view of the clogging of the checkerbrick when using Bunker-C or crude oils, it has been proposed to omit the checkerbrick in the carburetor and introduce Bunker-C or crude oil as the enriching medium into the top thereof, the oil gas and water gas flowing in the same direction down through the carburetor into the base of the superheater and up therethrough. Operating in this manner during the blasting cycle, blast gases sweep through the carburetor without substantial ignition thereof, and consequently, only a portion of the sensible and little or none of the latent heat of the gases is effective in heating the carburetor. Furthermore, operation in this manner creates a serious danger of the non-ignited mixture of air and blast gases exploding in the carburetor.

In contradistinction to the above operations, the procedure of this invention involves substantially immediate ignition of the air and blast gases upon their entrance into the carburetor. Furthermore, the enriching oil is introduced into the carburetor in a direction countercurrent to the flow of water gas therethrough, and as a result thereof, the oil is more efficiently vaporized and admixed with the water gas and the tendency towards carbon formation is reduced. The ignitor is preferably constructed of massive walls, which may be arranged laterally of the carburetor at a point adjacent the gas inlet, the walls functioning as heat reservoirs and ignitors to cause ignition of the mixture of blast gases simultaneously with their introduction into the carburetor during the blasting cycle. The enriching medium is introduced at a point below the series of walls, remote from the water gas inlet of the carburetor, in a direction countercurrent to the flow of water gas, and is substantially completely vaporized during its countercurrent flow, the oil vapors mixing with the water gas and passing therewith through the carburetor, the carbonaceous material resulting from the vaporization of the oil falling to the base of the carburetor which is entirely free of obstruction. It will be noted that in accordance with this invention, the carburetor is designed to immediately ignite the blast gases upon their entrance into the chamber to obtain the full value of the sensible and latent heat of the blast gases as they pass through the vaporizing chamber, and also to eliminate the explosion hazard hereinabove mentioned. Further, this invention permits enrichment of the water gas with Bunker-C or crude oil, the carbonaceous residue formed in the carburetor settling to the unobstructed base thereof where it does not interfere with the flow of gas through the carburetor and from whence it may be readily withdrawn through clean-out doors provided at the base of the carburetor.

Other objects and advantages of the present invention will be apparent from the following description.

In the accompanying drawings, forming a part of this specification and showing for the purpose of exemplification preferred forms of the invention, but without limiting the claimed invention to such illustrative instances:

Fig. 1 is a perspective view, partly in section, of a carburetor of a water gas set illustrating a preferred embodiment of my invention;

Fig. 2 is a section taken on the line 2—2 of Fig. 1;

Fig. 3 is a perspective view, partly in section, of a modified carburetor construction.

Figure 4:
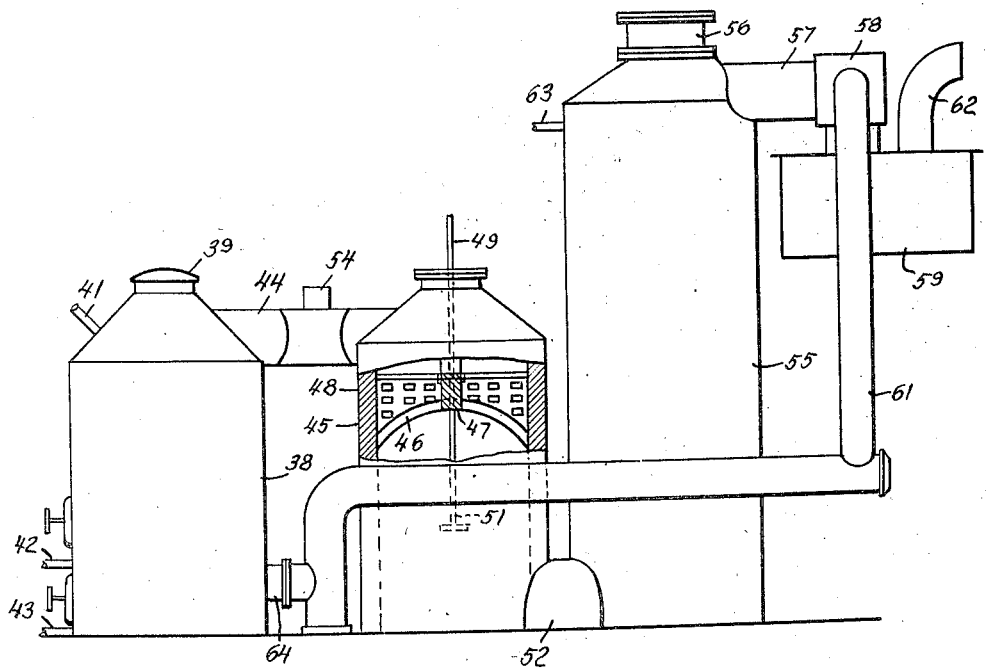
Fig. 4 is a side elevation, partly in section, of a water gas set embodying still a further modified form of the carburetor of my invention.

With reference to Fig. 1, the numeral 20 designates a cylindrical shell carburetor of the type generally used in connection with a water gas set comprising a generator, carburetor and superheater. An inlet 21 leading from a generator, such as generator 38 of Fig. 4, is provided for conducting gases from the generator into the top of the carburetor. An outlet 22 is provided for conducting the enriched gases from the carburetor to a superheater, such as superheater 55 of Fig. 4. The top of the carburetor shell, which is preferably of conical shape, is provided with a manhole 23 provided with a readily removable cover 24. Spray pipes 25, provided with discharge nozzles 26, are disposed in the walls of the carburetor and are adapted to discharge an enriching medium upwardly into the carburetor. The disposition of the pipes 25 is such as to provide one pipe in each 90° sector. A lining 27 of refractory material, such as firebrick or the like, is provided within the carburetor.

Ports 28 and 29 are provided in the base of the carburetor to serve as clean-out openings for the removal of carbonaceous material deposited as a result of the cracking of the enriching medium introduced through the spray pipes 25. The openings 28 and 29 are provided with any conventional closure means. Within the carburetor shell and adjacent the upper one-third thereof is a series of intersecting arched walls 31 and 32 of massive construction which are bonded at their extremities with the refractory lining 27 of the carburetor and which rise to a point of intersection substantially on the axis of the carburetor and immediately below the gas inlet 21. A series of four walls are preferably provided, the walls intersecting at the center of the carburetor at right angles to define 90° sectors, each sector containing one oil spray pipe 25 as above described. The arched walls 31 and 32 are preferably composed of refractory brick laid to provide openings 33 and may be coped with a suitable high temperature heat-resistant alloy, for example, the alloy known commercially as "Fahrite" which contains 40% nickel, 20% chromium, and 40% iron and which will stand temperatures of 2000° F. I have found that the lining of such refractory walls with high temperature heat-resistant metal, such as "Fahrite", is particularly advantageous since the metal has a tendency to prevent the adherence of carbon particles thereto. This characteristic of preventing adherence of carbon is particularly pronounced in nickel or nickel alloys.

The modified form of my invention shown in Fig. 3 differs from the embodiment shown in Fig. 1 and described above chiefly in the construction of the interior walls and the position of the point of oil introduction. The oil is introduced through a pipe 34 extending through the top of the carburetor and terminating in a discharge nozzle 35 adapted to discharge the oil upwardly toward the arched walls 31 and 32. The upper portion of the pipe adjacent the gas inlet is protected from the high temperatures experienced in the carburetor by a surrounding column 36 of refractory material which extends from the point of intersection of the arched walls 31 and 32 to the top of the carburetor, suitable brace members 37 being provided to ensure rigidity of construction. Otherwise the construction of the carburetor is substantially the same as that shown in Fig. 1.

It will be noted, in the above modifications of my invention, that the bottom of the carburetor is entirely free of obstructions and is readily accessible for cleaning purposes through the ports 28 and 29. The arched walls 31 and 32 are provided immediately adjacent the gas inlet opening 21 so that the gases entering the carburetor will immediately contact with said walls and thereafter pass to the vaporizing chamber defined between the bottom of arched walls 31 and 32 in the base of the carburetor.

In Fig. 4, I have shown the carburetor of my invention as employed in a water gas set wherein 38 designates a water gas generator containing a body of fuel (not shown). A charging opening 39 for fuel is provided at the top of the generator. Steam may be supplied to the carburetor through pipes 41 and 42 and air for blasting the fuel within the generator may be supplied through air blast pipe 43. The generator 38 communicates through the pipe 44 with the top of the carburetor 45 which contains intersecting arched walls 46 and 47 and refractory lining 48 of types similar to those shown in Figs. 1 and 3.

Means may be provided for introducing an enriching medium, such as oil, into the carburetor, said means preferably comprising a pipe 49 extending downwardly from the top of the carburetor to a point below the arched walls 46 and 47 and terminating in a spray nozzle 51 adapted to discharge the oil upwardly into the downwardly flowing stream of water gas. A conduit 52 connects the bottom of the carburetor 45 to the superheater 55. The superheater is provided with a stack 56 for the discharge of waste gases during the blasting cycle and an off-take 57 which leads from the top of the superheater to a housing 58 and a wash box 59. Secondary air opening 54 is provided for the admission of air into the carburetor during the blasting cycle. A conduit 61 leads from the base of the generator 38 to the housing 58. A suitable valve is positioned in housing 58 to control flow through the set as is well known.

The operation of the above-described set comprises three steps; to wit: a "blasting step", "an uprun", and "a backrun". In the "blasting step" air is passed into the generator through line 43 and passes through the fuel bed therein, raising the temperature thereof until the fuel becomes an incandescent mass. The resultant blast gases are passed into the carburetor 45 through the conduit 44. Secondary air is admitted to the carburetor at 54. The mixture of air and gas is immediately ignited upon contacting with the arched walls 46 and 47 mounted adjacent the gas inlet of the carburetor. As a result, the arched walls 46 and 47 and the refractory lining 69 throughout the length of the carburetor become very highly heated because of the combustion of the mixture of blast gases and air during its passage through the carburetor. The gases pass through the carburetor through conduit 52 into superheater 55. The waste gases, after heating the interior of the superheater, are discharged through the stack 56.

When the arched walls 46 and 47, refractory lining 48 and the interior of the superheater 55 have been brought to the requisite temperatures, the flow of air to the generator is shut off and the "uprun" step begun. Steam is passed into the base of the generator through inlet 42 and passes up through the fuel bed reacting therewith to form water gas. The water gas formed as a result of the reaction between the steam and hot fuel, passes through inlet 42 to the carburetor 45 wherein it is carbureted or enriched by the addition of oil through the spray nozzle 51. The oil is discharged into the carburetor in an upward direction below the arched walls 46 and 47, and flows in contact with the oppositely flowing water gas and is efficiently volatilized and cracked with the production of carbonaceous material and oil gas by reason of the transfer of heat from the refractory lining and the arched walls. Introducing the oil in a countercurrent direction results in improved dispersion and admixture of the oil particles and resultant vapors with the water gas, and also, due to greater surface of oil exposed to heat and contact of oil particles with the water gas, the oil is more efficiently cracked and vaporized. The oil gas formed by the vaporization of the upwardly directed oil particles becomes intimately mixed with the water gas by reason of the agitation of the two fluids within the carburetor, resulting from the counter-flow, forming a zone of volatilized oil adjacent the massive walls in the upper portion of the carburetor which act as a reservoir of heat thus aiding in securing efficient volatilization and cracking of the oil. The carbonaceous material settles into the large unobstructed space at the base of the carburetor where it accumulates without interfering with the flow of the gas though the carburetor. The high temperature present in the carburetor as a result of the heat contained in the walls of checkerwork partially fixes the mixture of the oil gas and water gas and assists in the production of a fixed homogeneous product. The resultant mixture passes from the carburetor through the conduit 52 to the superheater 55 wherein fixation is completed. From the superheater, the water gas formed passes into the wash box 59 from which it is led through outlet 62 to a suitable holder.

The "steam uprun" step may be immediately followed by a "steam backrun" step. Conduit 57 is closed to the flow of gas, and steam is admitted at 41 or 63, the inlets 42 and 43 being closed. The steam admitted at 63 is superheated in its passage through the superheater and the carburetor and passes into the top of the generator and downwardly through the fuel bed therein. If desired, oil, such as Bunker-C oil, other crude oil, tar, or a hydrocarbon material may be introduced into the top of the generator during the backrun of steam, the resultant oil vapors passing with the steam down through the fuel bed, and the carbonaceous residue formed by the decomposition of the oil or tar being deposited on the top of the fuel bed. The water gas, or in the case where oil is introduced into the top of the generator, carbureted water gas formed in the generator leaves at 64 through the conduit 61 and passes to the wash box 59, thereafter being conducted to a suitable holder.

During the carburetion of the uprun gas, due to the cracking of the oil, particularly when Bunker-C or unrefined oils are employed, large amounts of carbonaceous material are formed and deposited on the walls and the base of the carburetor. To remove the carbon deposit and clean the carburetor walls and the refractory walls it is only necessary to shut off the flow of gas, open the man-hole provided in the top of the carburetor and scrape the carbon deposit from the lining and arched walls with any suitable tool. The carbon falls to the bottom of the chamber from which it is readily removed through the clean-out ports provided at the bottom of the shell, the time consumed in the cleaning operation being of the order of 30 minutes. Thus, it is evident that the water gas set need be shut down for only a very short period of time, after which operation may again be resumed.

It will be noted that in accordance with my invention, Bunker-C or unrefined oils of low cost may be efficiently utilized in the enrichment of water gas, the large unobstructed space at the base of the carburetor permitting settling of the carbonaceous material formed from the cracking of the crude oil, from which the carbonaceous residue may be readily removed when desired. Furthermore, the refractory material provided in the top of the carburetor adjacent the gas inlet insures immediate ignition of the entering mixture of blast gases and secondary air, thereby making the latent and sensible heat of the gases available for use in heating the vaporizing portion of the carburetor as the ignited gases subsequently pass therethrough. By reason of the coping provided on the upper face of the refractory walls, the carbonaceous material is prevented from depositing and accumulating thereon and instead settles to the unobstructed space provided at the base of the carburetor, which is of such size as to eliminate the necessity for cleaning except at relatively long intervals of time. Further, the ignitor within the carburetor eliminates explosion hazards.

Since certain changes may be made in carrying out the above process without departing from the scope of the invention, it is intended that all matter contained in the above description shall be interpreted as illustrative and not in a limiting sense.

I claim:

1. In a process for producing carbureted water gas in a water gas set involving a carburetor having a gas inlet at one end and a gas outlet at the opposite end, an igniter occupying a minor portion of the carburetor and leaving the remaining major portion of the carburetor completely unobstructed throughout the horizontal cross-sectional area thereof, the steps which comprise alternately preheating the carburetor by passing therethrough a mixture of blast gases and secondary air, igniting the mixture of blast gases and secondary air upon its entrance into the carburetor, and burning said blast gases as they flow through the unobstructed major portion of the carburetor extending from said igniter to said outlet to store heat in said carburetor, intermittently flowing water gas from an outside source through said carburetor, providing a spray of heavy oil directed countercurrent to the flow of water gas so that turbulence between the heavy oil and water gas is set up, the oil is cracked and products of decomposition settle through the large unobstructed space in contact with the flowing water gas stream, and withdrawing the mixture of oil gas and water gas from the carburetor.

2. In a process for producing carbureted water gas in a water gas set which involves a carburetor having a top side inlet and a base side outlet, and having an igniter at the upper portion thereof occupying a minor portion of said carburetor, a vaporizing chamber immediately below the said igniter disposed with the upper portion of the vaporizing chamber in the upper portion of the carburetor near the gas inlet, the portion of the carburetor beneath the igniter being unobstructed, the steps which comprise alternately preheating the carburetor by passing therethrough a mixture of blast gases and secondary air, igniting the mixture of blast gases and secondary air upon its entrance into the carburetor and prior to introduction into the vaporizing chamber, and burning the mixture passing through the vaporizing chamber as it flows through the vaporizing chamber occupying the major portion of the carburetor to store heat therein, intermittently flowing water gas from an outside source downwardly through said carburetor, providing an upwardly directed spray of heavy oil in the vaporizing chamber of said carburetor, the flow of heavy oil thus introduced being countercurrent to the flow of water gas through the carburetor, the oil being caused to flow into the said upper portion of the carburetor where cracking thereof takes place, products of decomposition formed settle down through the flowing water gas stream and collect at the bottom of the carburetor and the oil gas formed mixes with the water gas, the resultant mixture being withdrawn from the base of the carburetor.

3. In a process for producing carbureted water gas in a set involving a carburetor consisting of an ignition chamber composed of a wall extending from one side of the carburetor to the other and providing large unobstructed passageways for free flow of gas therethrough, and a vaporizing chamber in series, said vaporizing chamber constituting the remaining portion of the carburetor and being substantially unobstructed, the improvement which comprises alternately preheating said carburetor by introducing blast gases and secondary air from an outside source into the ignition chamber and subsequently burning said gases in the vaporizing chamber, intermittently flowing water gas from an outside source through said chambers in series, simultaneously introducing and vaporizing a spray of heavy oil in the vaporizing chamber of said carburetor in conjunction with the flow of water gas, the sprayed oil flowing in a direction opposite to the flow of water gas through said vaporizing chamber, and depositing the residual carbon formed from said oil upon the bottom of said carburetor.

4. In a process for producing carbureted water gas in a set involving a carburetor consisting of an ignition chamber composed of a wall extending from one side of the carburetor to the other contiguous to the top inlet to the carburetor and providing large unobstructed passageways for free flow of gas therethrough, and a vaporizing chamber beneath said wall, said vaporizing chamber constituting the remaining portion of the carburetor and being substantially unobstructed, the improvement which comprises alternately preheating said carburetor by introducing blast gases and secondary air from an outside source into the ignition chamber and subsequently burning said gases in the vaporizing chamber, intermittently flowing water gas from an outside source downwardly through said chambers in series, simultaneously introducing and vaporizing a spray of heavy oil in the vaporizing chamber of said carburetor in conjunction with the flow of water gas, the sprayed oil being introduced upwardly into the downflowing water gas stream, depositing the residual carbon formed from said oil upon the bottom of said carburetor, and withdrawing the carbureted water gas from the base of the carburetor.

5. In a process for producing carbureted water gas in a set involving a carburetor consisting of an ignition chamber composed of intersecting walls extending from one side of the carburetor to the other in the upper portion of the carburetor, providing large unobstructed passageways for free flow of gass therethrough, and a vaporizing chamber in series, the upper portion of said vaporizing chamber being defined by the base of said walls which are dome-shaped, the said ignition chamber occupying a minor portion of the carburetor and the said vaporizing chamber constituting the remaining portion of the carburetor and being substantially unobstructed, the steps which comprise alternately preheating said carburetor by introducing blast gases and secondary air from an outside source into the ignition chamber, which causes ignition of the blast gases to take place, and subsequently burning said gases in the vaporizing chamber, intermittently flowing water gas from an outside source through said chambers in series, projecting a plurality of sprays of heavy oil into the vaporizing chamber from the periphery of the carburetor, the said sprays converging in the top portion of the carburetor beneath the said walls and being projected in a direction opposite to the flow of water gas through the carburetor, causing carbonaceous deposits formed upon decomposition of the heavy oil to settle through the said vaporizing chamber into the bottom of the carburetor, and removing the carbureted water gas from the carburetor.

CHARLES H. HUGHES.